United States Patent Office

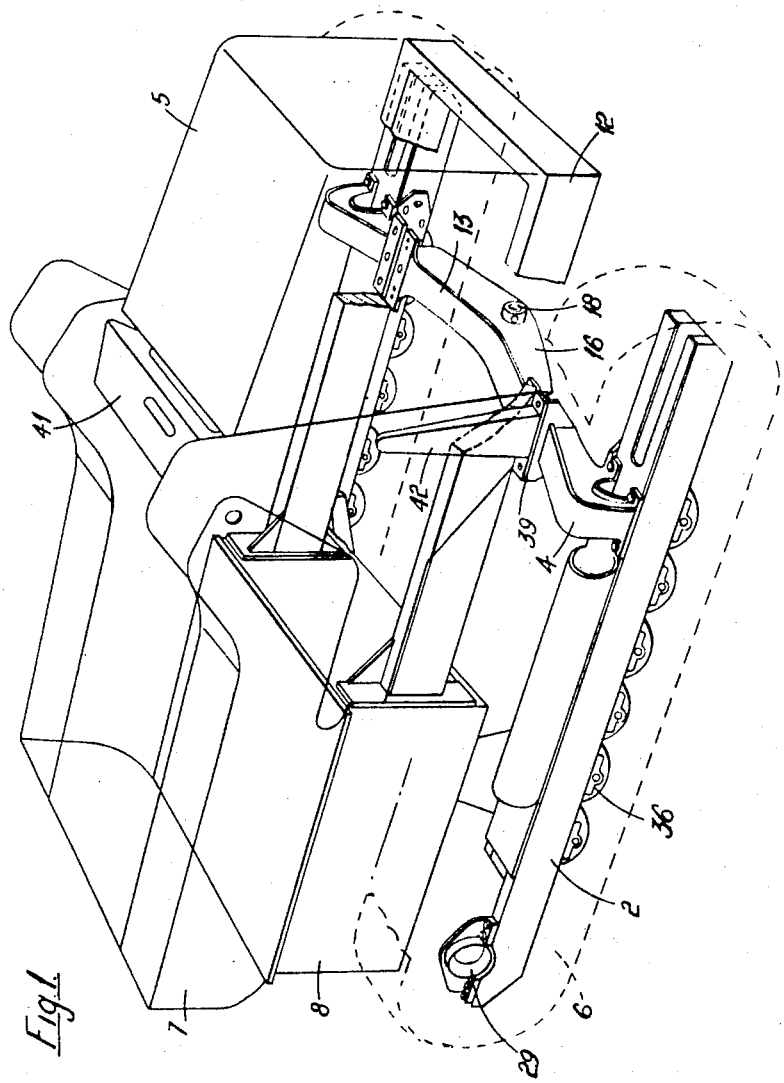

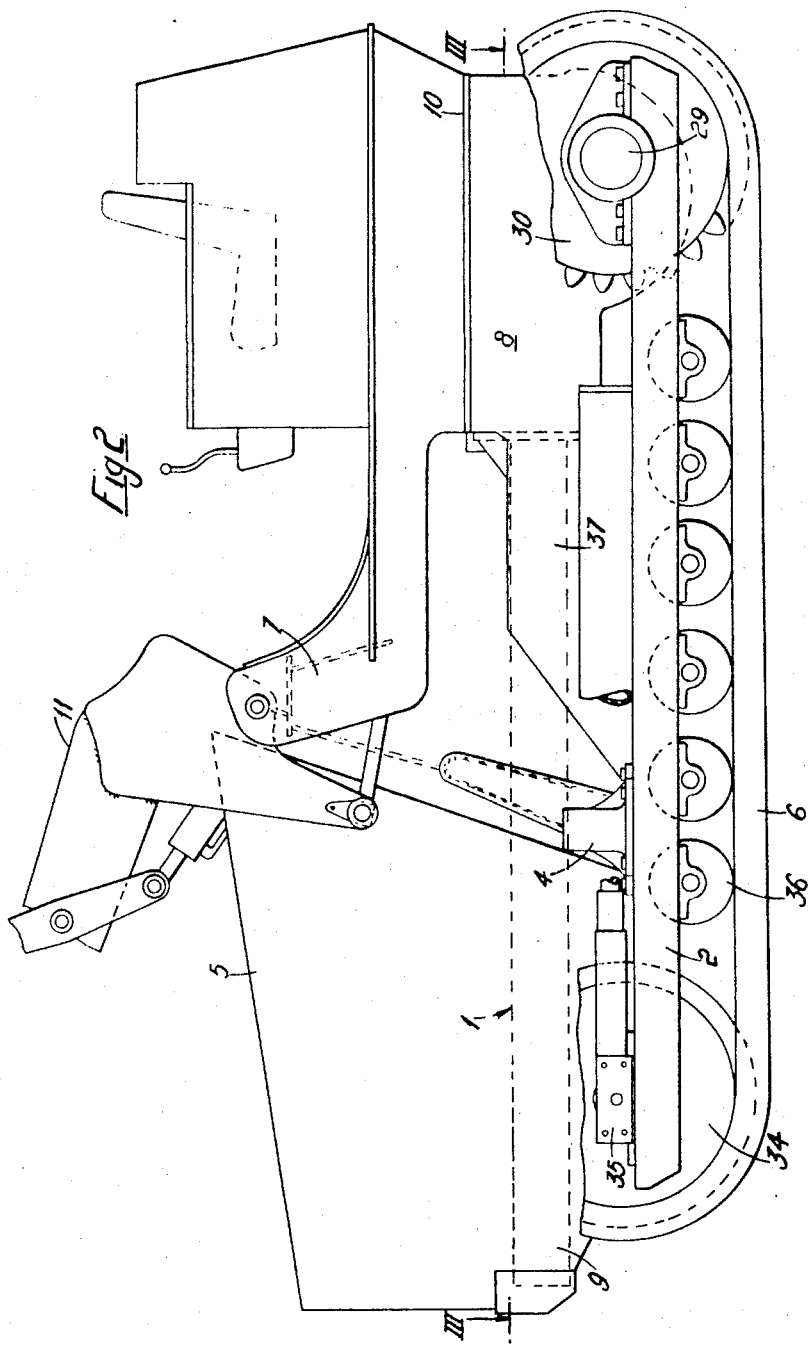

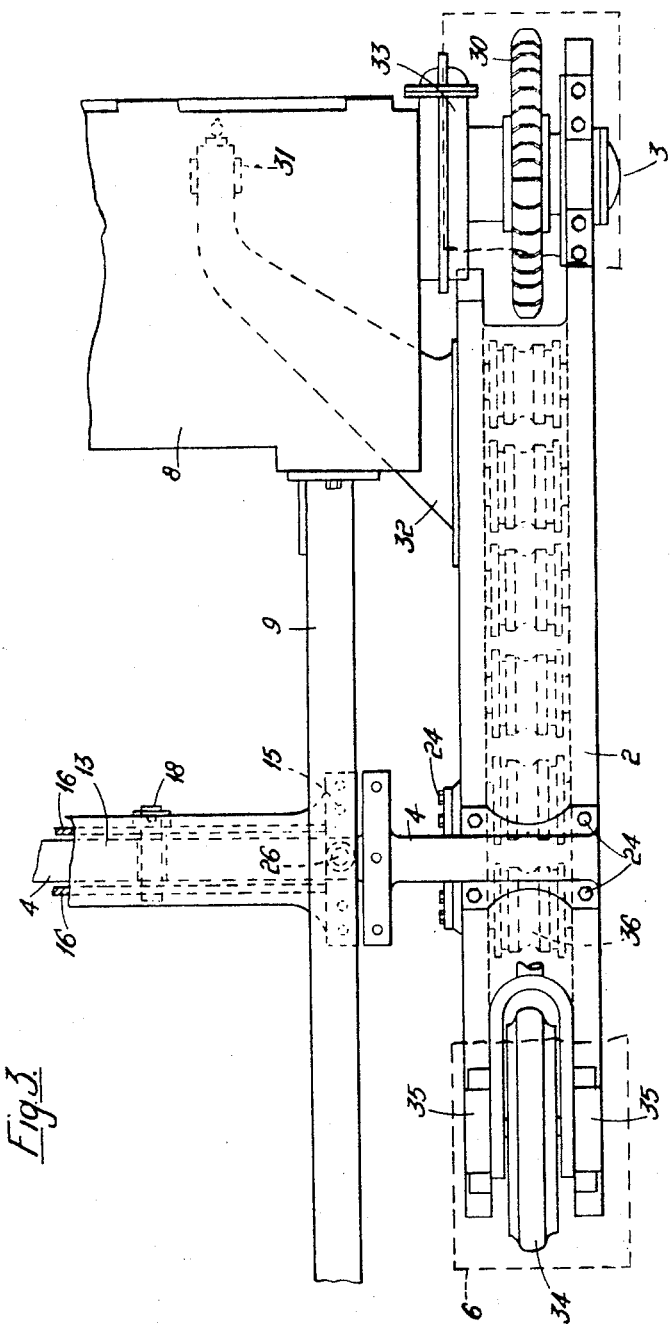

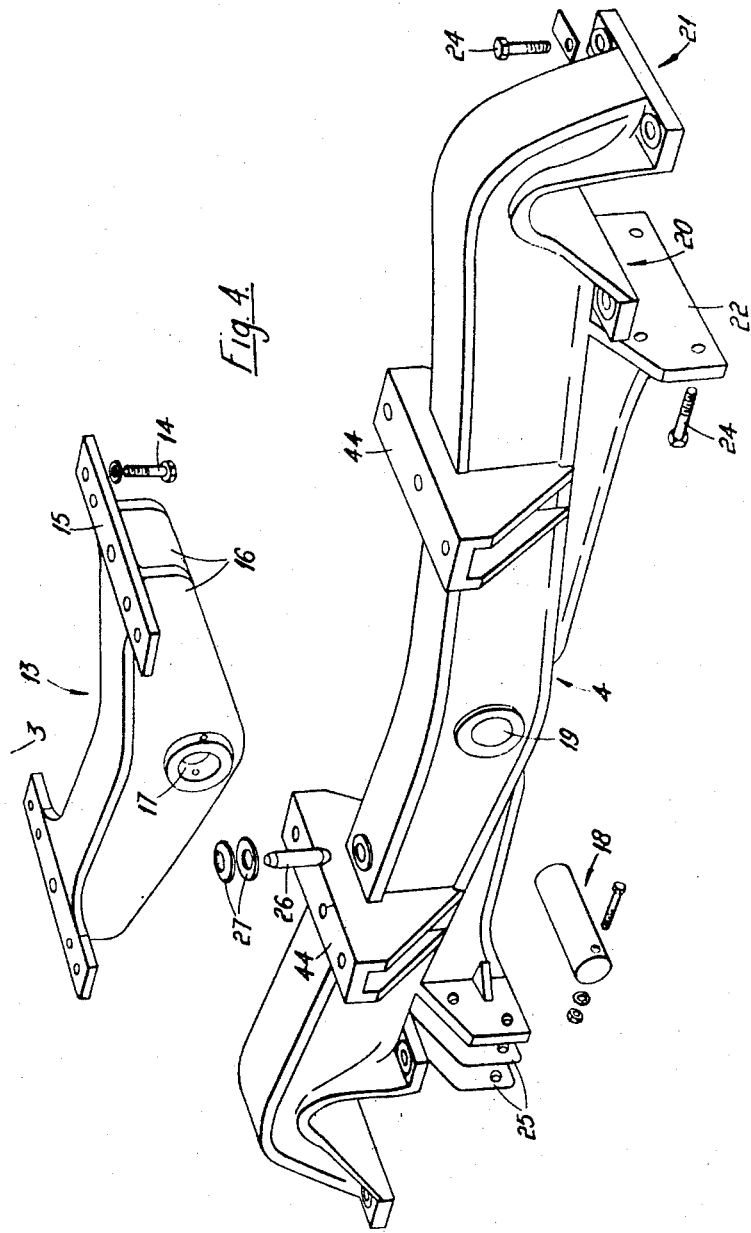

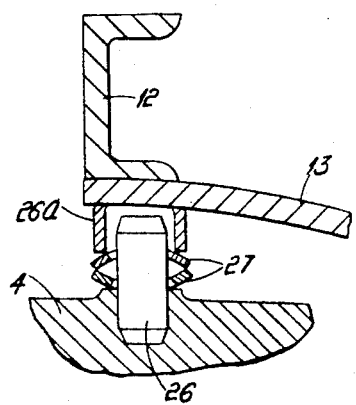
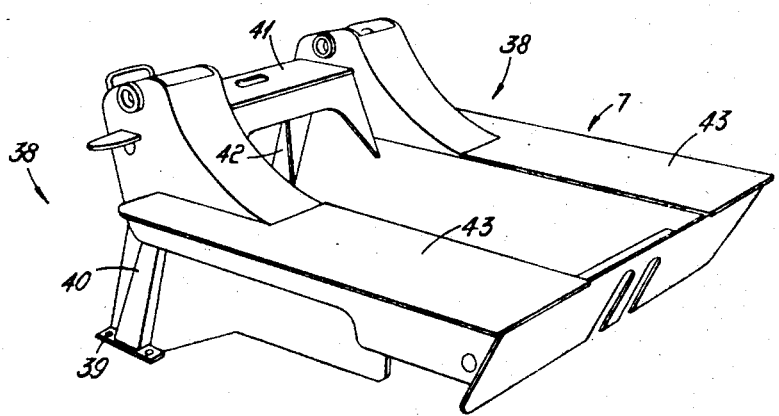

3,465,839
Patented Sept. 9, 1969

3,465,839
FRAMEWORK FOR A CRAWLER VEHICLE
Pietro Pensa, Milan, Italy, assignor to Massey-Ferguson Services N.V., Curacao, Netherlands Antilles
Filed Feb. 19, 1968, Ser. No. 706,331
Claims priority, application Italy, Feb. 28, 1967, 13,180A/67, Patent 791,066
Int. Cl. B62d 55/10, 55/26
U.S. Cl. 180—9.54                               11 Claims

ABSTRACT OF THE DISCLOSURE

According to the present invention, there is provided a framework for a crawler vehicle comprising a main frame for supporting an engine and transmission assembly, side frames pivotally mounted at one end thereof on the main frame for angular movement about a horizontal axis and a transverse frame member spaced longitudinally from the axis, pivotably connected at its mid-point to the main frame, and rigidly secured to the side frames at their ends, a high rate spring provided resiliently to resist angular movement between the main frame and the transverse frame member, and a positive stop device to provide solid abutment and limit angular movement between the main frame and the transverse frame member.

---

This invention relates to a framework for a crawler vehicle.

In crawler tractors equipped with a dozer blade it is usual to arrange the framework so that the track-carrying side frames are permitted to move angularly in a vertical plane about a horizontal axis near the driving sprocket which is situated at the rear end of the tracks. The side frames support the front of the tractor through a transverse rocking member pivoted at its mid-point on the main frame and resting or pivoted at its extremities, on the side frames. This articulation is desirable in order that the attitude of the dozer blade shall be disturbed as little as possible by side rocking movement of the tractor. The transverse rocking member is sometimes constituted by a leaf spring.

On crawler tractors equipped with shovel buckets, it has not hitherto been necessary for the side frames to be allowed to articulate for the reason that the attitude of the tractor is unimportant so long as the bucket if filled. Hitherto, it has been the practice to make the cross member from a solid member and to bolt or otherwise rigidly secure its end to the side frames and its mid-portion to the main frame. Breakages have bene known to occur in the main frame, side frames or transverse member with this construction and it is an object of the present invention to provide a frame work in which the possibility of such a breakage occurring is reduced.

According to the present invention, there is provided a framework for a crawler vehicle comprising a main frame for supporting an engine and transmission assembly, side frames pivotally mounted at one end thereof on the main frame for angular movement about a horizontal axis and a transverse frame member spaced longitudinally from the axis, pivotably connected at its mid-point to the main frame, and rigidly secured to the side frames at their ends, a high rate spring provided resiliently to resist angular movement between the main frame and the transverse frame member, and a positive stop device to provide solid abutment and limit angular movement between the main frame and the transverse frame member.

The maximum deflection permitted at the spring is desirably not more than 1% and preferably approximately one-tenth of one percent of the track gauge width of the vehicle. The load required to achieve solid abutment of the positive stop device is desirable of the order of five times the vehicle weight.

Where the framework is intended for a crawler vehicle including a bucket apparatus the frame desirably comprises a bridge structure for supporting the bucket apparatus. The bridge structure may be partially supported directly on the transverse frame member to avoid loads arising from the presence of the bucket from passing through the main frame. Preferably, the main frame and the bridge structure are firmly joined together at one point and connected together through the medium of the spring at another point.

A preferred embodiment of the invention will now be described by way of example with reference to the accompanying drawings, in which:

FIG. 1 is a perspective view of a crawler tractor illustrated partially in ghost outline and embodying a framework according to the present invention;

FIG. 2 is a side elevation of the tractor showing some of the main parts thereof;

FIG. 3 is a view of the vehicle main frame with some of the superstructure parts omitted and is on the section line III—III of FIG. 2;

FIG. 4 is a perspective exploded detail view of a part of the framework;

FIG. 5 is a cross sectional enlarged detail from FIG. 4; and

FIG. 6 is a perspective view of a bucket gear support structure.

Referring to the drawings, a crawler tractor has a framework consisting generally of a main frame 1 which extends from front to rear of the tractor, side frames 2 pivotally supported at their rear ends on the main frame 1 on a transverse axis 3, and a transverse frame member 4 connected at its ends to both side frames 2 and supporting the main frame 1 towards the front portion of the latter. An engine 5, tracks 6, and bucket gear support structure 7 are shown in FIG. 1, and it will be appreciated that other parts of the tractor have been omitted from the drawings for the sake of clarity.

Referring to FIGS. 1, 2, and 3, the main frame 1 consists of a massive base structure 8 at its rear for supporting the tractor transmission. The frame 1 is rectangular and its remaining portion 9 extends forwardly from the base 8 and supports the engine 5. The base structure 8 serves as a partial support for the bucket gear support structure 7 at the rear along an interface 10 across which they are bolted together. A bucket gear is indicated generally, the reference 11 identifying particularly the rear end of the bucket boom, the remainder of the gear being omitted.

FIGS. 1, 3 and 4 illustrate the front portion 12 of the main frame 1 and particularly a cross member 13, which is securely bolted to the underside of the longitudinally extending front frame portion 12 by bolts 14 in pads 15 at the ends of the cross member. The cross member 13 is formed with deep plates 16 extending transversely to the longitudinal line of the tractor and one behind the other. Each carries a journal bearing 17 for receiving and supporting a journal pin 18. A transverse frame member 14, which can be referred to as a beam 4, is pivoted between the plates 16 on the pin 18, which passes through a bearing 19 placed at the transverse mid-point of the beam 4, which is symmetrical about this point. At each end of the beam 4 three surfaces are presented for bolt attachment to the side frame 2 adjacent thereto. The three surfaces are the outboard and inboard downwardly presented surfaces 20 and 21 and an outwardly presented vertical surface 22. Bolts 24 pass through the beam 4 and the side frame at these surfaces and attach the two firmly together.

Use is made here of the word "firmly" when describing a bolted joint instead of the word "rigidly." This is because it is desired to draw attention to the fact that a bolted joint can permit deflections of its joined parts under high loading conditions, as for instance those experienced under impulse or shock loading when a sudden momentum change appears in the structure subjected to the change as a very high load for an extremely small period of time. Under the working conditions experienced for the greater part of the time the joint could be regarded for practical purposes as "rigid."

Shims 25 can be provided between one or both of the vertical surfaces 22 and the associated side frame 2 to enable the side frames 2 to be properly aligned with each other and the main frame on assembly.

Abutment pins 26 are provided at equal distances on each side of the journal pin 18 and in vertical alignment with the main frame portions 12 above, and dished springs 27 encircle the pins. The dished springs 27 are of the type known as Belleville springs and are made of spring steel. The characteristics of these springs can be chosen to meet the requirements by specifying their diameters, thickness and initial deflection, but for the purposes of the invention they would be required to have a very small deflection for a very high load.

They are assembled together in pairs in the manner shown in FIG. 5. FIG. 5 shows only a single pair assembled but there is no reason why more pairs should not be used if there is space available. Each abutment pin 26, as well as providing a location within a loosely surrounding tube 26a depending from the cross member 13, provides a solid abutment between the cross member 4 and the frame portion 9 when a sufficient impulse load is applied. In the present embodiment the beam 4 is assembled to the cross member 13 by compressing the spring 27 between the tube 26a and the beam 4 and inserting the journal pin 18. Thus, they are given a preload of about one third the tractor weight during assembly. Clearly, if necessary, a suitable device such as a small adjusting screw could be employed to give the preload after assembly.

Referring now to FIGS. 1, 2 and 3 the side frames 2 are supported by the structure 8 at the rear by a bearing 29 at the outboard side of a sprocket wheel 30 and on the same axis 3 by a bearing 31 placed at the inner end of an arm 32 welded to the inner side of each side frame 2 and extending inwardly and rearwardly therefrom. The sprocket wheel 30 is carried by a bull gear housing 33 bolted to the base structure 8. At the front of the side frame an idler wheel 34 is carried in bearings 35 and six rollers 36 are journalled on the side frame and bear on the lower run of the track 6 passing between the sprocket and idler wheels 30 and 34. In FIG. 2 a slack adjuster piston and cylinder device 37 is cut away to show the cross member 4. The slack adjuster is not considered to be part of the present invention. Two upper rollers, not shown, carry the upper run of the track 6 from sprocket wheel to idler wheel.

Referring to FIG. 6 the bucket gear support structure 7 is constituted by a bridge 38 extending from one foot 39 through a leg 40 upwards to an arch 41 connecting with the opposite leg 42 and foot (not seen). The bridge 38 is given stability in several directions by the rearward boxlike extensions 43, which extend rearwardly from the junction of the legs 40 and 42 with the arch 41. The rear terminal portions of the extensions 43 are bolted to the top of the base structure 8 across the interface 10, as already stated. The feet are bolted firmly each to pads 44 on the beam 4.

The essence of the invention requires that the deflection permitted to the beam 4 is very small.

A suitably comparison is possible between the vehicle of the present invention and the type of crawler vehicle used with a dozer blade and in which the tracks are required to follow the ground contours as much as possible in order to obtain maximum traction. In this type of crawler, known as a dozer-crawler, the tracks are permitted to move up and down at the front relative to each other by up to about 16% of the track gauge width. In the dozer crawlers where a single pivoting beam supports the forward part of the main frame, the beam is located about two-thirds of the length of the sprocket center to idler wheel center from the rear. Accordingly, the percentage deflection based on track gauge, at the pivoting beam is of the order of 10%. In the preferred embodiment of the present invention the maximum permitted deflection is of the order of one-tenth of one percent of the track gauge. The track gauge is the transverse distance between the center planes through the sprocket teeth.

To illustrate the type of shock loading experienced by the tractor, which the present invention is intended to mitigate, let a typical loading case now be considered.

Let it be supposed that the tractor is traveling fast along a level surface and the front of one track strikes a stone sufficiently small for the track to climb over but sufficiently large to cause a very large vertical load at the front of the track, also let the bucket be in a lowered position and empty.

In these circumstances, as in others, the reaction to sudden loads is by the setting up of inertia forces. The main inertia centers in this case are the engine and the transmission casing 8, these being the main centers of mass. The engine is located on the main frame portion right above the beam 4 and the transmission casing is located far back along the main frame portion 9. The inertia of the engine would tend to cause high shear loading in the beam 4 between the side frame and the adjacent connection to the main frame. The inertia of the transmission casing would tend to cause high shear and bending loading at the rear of the main frame portion 9. The presence of the spring 27 between the beam and the main frame reduces the impulse loading on both the beam and the main frame by increasing the time factor and consequently lowering the force factor, it being well known that the impulse is equal to momentum divided by time. The springs being of extremely high rate, only come into effective operation when very high loads are experienced and, moreover, if the loads are such as to cause solid abutment between the beam and the main frame it will be apparent that some shock loading will then be transmitted, it will not be anything like the magnitude experienced if the springs were not present.

The very small deflection permitted is merely to alleviate the shock and must be very large because there are conditions of loading which tend to cause deflection in steady state conditions and the tracks must not be permitted to move up and down so as to let the vehicle sway dangerously when a full bucket is lifted high.

Let it now be assumed that the tractor is traveling exactly as before but with a full bucket raised to its fullest extent. The main inertia center is now the full bucket. If the bucket support gear were to be located wholly on the main frame the loads experienced by the frame would be very large indeed. To avoid this, the bucket gear support structure 7 is supported partially on the beam 4 by means of the feet 39 and legs 40 and 42. Thus, the bucket structure 7 relieves the vehicle main frame from carrying the loads arising from bucket inertia and the loads carried across the springs 27 are almost what they were before.

In a crawler tractor, which is fabricated using bolted and welded joints, it is very easy to build in stresses during manufacture. The present invention permits relief of at least some of these built-in stresses by providing a flexible connection between two important parts of the vehicles.

I claim:

1. In a framework for a crawler vehicle comprising a main frame for supporting an engine and transmission assembly, side frames pivotably mounted at one end thereof at each side on the main frame for angular movement about a horizontal axis and a rigid transverse frame member spaced longitudinally from the axis, pivotably connected at its midpoint to the main frame about a fixed longitudinal axis, and rigidly secured against relative movement in all directions to the side frames at their ends, the improvement comprising high rate spring means provided resiliently to resist angular movement about said longitudinal pivot axis in both directions between the main frame and the transverse frame member, and positive stop means to provide solid abutment and limit angular movement about said longitudinal pivot axis in both directions between the main frame and the transverse frame member to not more than 1% of the track gauge width of the vehicle.

2. A framework according to claim 1, in which the maximum permitted deflection is approximately one-tenth of one percent of the track gauge width of the vehicle.

3. A framework according to claim 1, in which the load required to achieve solid abutment of the positive stop means is of the order of five times the vehicle weight.

4. A framework according to claim 1, comprising a bridge structure for supporting bucket apparatus, the bridge structure being partially supported directly on the transverse frame member to avoid loads arising from the presence of the bucket from passing through the main frame.

5. A framework according to claim 1, comprising a bridge structure for supporting bucket apparatus, the main frame and the bridge structure being firmly joined together at one point and connected together through the medium of the spring at another point.

6. A framework according to claim 1, wherein the spring and stop means comprise two identical springs and stop devices provided at equal distances from and on each side of the midpoint of the transverse frame member.

7. A crawler vehicle including a framework according to claim 1.

8. A framework according to claim 1, in which the spring means is a compression spring.

9. A framework according to claim 8, in which the spring comprises paired oppositely mounted Belleville springs.

10. A framework according to claim 9, comprising a pin encircled by the Belleville springs and which, together with the main frame forms the stop means.

11. A framework according to claim 10, comprising a cross member firmly secured to the main frame and providing the pivotal connection between the main frame and the transverse frame member, and a tube extending downwards from the cross member, the pin being carried by the transverse member and being loosely guided in the tube.

References Cited

UNITED STATES PATENTS

| | | | |
|---|---|---|---|
| 1,216,681 | 2/1917 | Gobiet | 180—9.54 |
| 1,258,602 | 3/1918 | Turnbull | 180—9.54 |
| 1,443,768 | 1/1923 | Stahl | 180—9.54 |
| 2,063,035 | 12/1936 | Fuller | 180—9.5 |
| 2,519,974 | 8/1950 | Mork | 214—140 |
| 2,670,249 | 2/1954 | Pilch | 180—9.5 |
| 2,741,377 | 4/1956 | Gauthier | 214—130 |

RICHARD J. JOHNSON, Primary Examiner

U.S. Cl. X.R.

214—140